United States Patent Office 2,733,189
Patented Jan. 31, 1956

2,733,189

DESULFURIZATION OF HIGH BOILING HYDROCARBONS

William I. Gilbert, Oakmont, John G. McNulty, Glenshaw, and Charles W. Montgomery, Oakmont, Pa., assignors to Gulf Research & Development Company, Pittsburgh, Pa., a corporation of Delaware No Drawing. Application January 7, 1953,
Serial No. 330,162

4 Claims. (Cl. 196—28)

This invention relates to the hydrodesulfurization of high boiling hydrocarbons such as crude petroleum.

Hydrodesulfurization of hydrocarbons usually involves contacting the hydrocarbon, while substantially in vapor phase, with hydrogen at elevated temperature and pressure in the presence of a hydrogenation catalyst. The use of high pressures avoids or reduces deposition of carbon on the catalyst. However, moderate pressures such as 250 to 2,000 pounds have advantages such as reduced hydrogen consumption, etc. which at least partially offset the increased deposition of carbon which takes place in this moderate pressure range. When carrying out this process at moderate pressures of 250 to 2,000 p. s. i. and especially when treating heavy hydrocarbons in this pressure range the catalyst must be intermittently regenerated by combustion because the deposition of carbon thereon lowers the activity of the catalyst.

Applicants have found that with this modification of the process in which regeneration at frequent intervals is necessary, the desulfurized product contains a substantial amount of residual sulfurous material. Applicants have also found, in accordance with the invention, that this residual sulfur can be removed by heating the product to about 375° to 500° F. for between about 15 minutes and three hours. The sulfur is removed or evolved during the heating treatment in the form of hydrogen sulfide. However, the sulfur before removal is not present in the product in the form of hydrogen sulfide since passage of an inert gas such as nitrogen through the hydrodesulfurized product does not result in a removal of the residual sulfur.

Our invention therefore includes the combination of steps of hydrodesulfurizing a high boiling petroleum oil under conditions which necessitate intermittent regeneration and heating the hydrodesulfurized product at a temperature between 375° and 500° F. for a period of time between about 15 minutes and 3 hours.

The invention is applicable to the treatment of any high boiling hydrocarbon which contains sulfurous materials. It is particularly applicable to the treatment of crude petroleum such as West Texas crude, Kuwait crude, Baxterville crude, etc. However, other high boiling hydrocarbons such as topped or reduced crudes or high boiling fractions may be similarly treated. The hydrocarbon to be desulfurized is first substantially vaporized and is contacted with hydrogen in the presence of a hydrogenation catalyst at a temperature of 750° to 900° F. and at a pressure of between about 250 and 2,000 p. s. i. as in conventional prior art procedure. This operation is terminated when the catalyst requires regeneration and before a throughput of about 16. A throughput of about 1 to 4 will in general be employed, especially for the lower quality crudes.

The catalyst is then regenerated to remove the coke deposited thereon and sulfur combined therewith. This regeneration is accomplished in known manner by contacting the catalyst with air or other oxygen-containing gas, usually diluted with an inert gas such as steam. When the regeneration of the catalyst has been completed the hydrocarbon vapor and hydrogen are again passed into contact with the regenerated catalyst.

The catalyst may be any hydrogenation catalyst, such as nickel, cobalt, tungsten, molybdenum or their oxides. A preferred catalyst is a combination of an iron group oxide with an oxide of group VI of the left hand column of the periodic table. Examples of such combinations are nickel tungstate and cobalt molybdate. The catalyst is preferably deposited upon a refractory porous carrier such as alumina or a silica-alumina cracking catalyst. The hydrodesulfurization may be of the catalytic type which involves conversion of the sulfur compounds into hydrogen sulfide, in which event the hydrogen sulfide is removed from the vapors when the reaction product is condensed. On the other hand, the hydrodesulfurization may be of the absorption or contact type, which involves fixation of the sulfur on the hydrogenation catalyst. Thus, when an iron group metal or metal oxide such as nickel is used the sulfur reacts with, or is absorbed by, the nickel to form nickel sulfide. This process is usually terminated before hydrogen sulfide appears in the product and the absorbed sulfur is removed during regeneration of the catalyst or contact. It is to be understood that our invention is applicable to either the absorption or the catalytic type of desulfurization process. The catalyst may be in the form of pellets in a fixed bed or a fluidized fixed bed operation may be used.

The desulfurized product is further treated by heating to a temperature of 375° to 500° F. to convert the residual sulfur contained therein into hydrogen sulfide. A temperature below 375° F. does not result in material removal of sulfur, whereas a temperature above 500° F. is not only uneconomical, but results in decomposition of the hydrocarbon product. The heating time at this temperature will vary with different charge stocks but it has been found that with most high boiling products a period of at least about 15 minutes is required to remove sulfur in material amounts and that removal of sulfur will be substantial within a period of about 3 hours. Although the invention removes a substantial amount of the residual sulfur it does not effect complete removal since apparently some of the sulfur is present in a refractory form. Continued heating beyond the 3 hour period does not effect removal of much of this refractory material and therefore longer heating periods are not advantageous.

To illustrate the manner in which the invention may be carried out and the results obtained when practicing the invention, three crudes, i. e. a West Texas crude, a Kuwait crude and a Baxterville crude (inspection data on which are given in Table I) were hydrodesulfurized with a nickel tungstate catalyst under the conditions shown in Table II.

TABLE I

Inspection data on crudes for hydrodesulfurization runs

|  | West Texas Crude | Kuwait Crude | Baxterville Crude |
|---|---|---|---|
| ° API | 35.1 | 31.3 | 15.9. |
| Sp. Gr., 60/60 | .8493 | .8692 | .9600. |
| Distillation: |  |  |  |
|    Percent at 392° F | 31 | 25 | 2. |
|    Percent at 500° F | 42 | 35 | 8. |
|    Percent at 590° F | 54 | 44 | 18. |
| Viscosity: |  |  |  |
|    at 100° F | 42.3 SUS | 58.3 SUS | 3,053 SUS. |
|    at 210° F |  |  | 146. |
| Carbon Residue: |  |  |  |
|    (Total) | 2.06 |  | 12.68. |
|    (BTMS) | 5.07 | 9.1 | 16.4. |
| Sulfur, percent | 1.34 | 2.59 | 2.77. |
| Flash PM, ° F | below 60 | 79 | 120. |
| Pour, ° F | below 0 | −35 | below 0. |

TABLE II

| Run No. | 1 | 2 | 3 | 4 |
|---|---|---|---|---|
| Charge Stock | W. Texas Crude | W. Texas Crude | Kuwait Crude | Baxterville Crude. |
| Catalyst | NiO·WO₃ on Al₂O₃ | NiO·WO₃ on Al₂O₃ | NiO·WO₃ on Al₂O₃ | NiO·WO₃ on MSA. |
| Type of Operation | Fixed-Bed Upflow | Fixed-Bed Upflow H₂ Flush Every 16 T. P. | Fixed-Bed Downflow | Fluid Bed. |
| Temp., °F. | 850 | 830 | 850 | 844. |
| Pressure, P. s. i. g. | 500 | 1,000 | 500 | 900. |
| S. V. Vol./Vol. cat./Hr. | 1.0 | 4.0 | 1.0 | .47 (wt./wt. cat./hr.). |
| T. P., Vol./Vol. cat. | 4.0 | 112–128 | 4.0 | 1.9 (wt./wt. cat.). |
| H₂ Rate, cu. ft./bbl | 5,000 | 5,000 | 5,000 | 19,430. |
| Product Inspection: | | | | |
| °API | 44.6 | 38.2 | 44.3 | 46.0. |
| S, Percent | 0.17 | 0.56 | 0.45 | 0.218. |
| Distillation: | | | | |
| Percent @ 392° F | 47 | 32 | 46 | 65.5. |
| Percent @ 500° F | 66 | 47 | 67 | 81.2. |
| Percent @ 590° F | 82 | 62 | 81 | 91.0. |

Samples of the hydrodesulfurized crudes from these runs were analyzed for sulfur content and then introduced into test apparatus for heat treatment. This apparatus consisted of a one-liter distillation flask provided with a thermo-well and a side arm to permit introduction of a small stream of gas into the oil charge in the flask. A 12-inch reflux column packed with 6 mm. glass beads to a depth of about six inches was attached to the upper part of the flask. The column was provided with an insulated electrically heated jacket and the upper end was connected to a condenser provided with a stopcock for removal of distillate and a capillary vapor line leading to a absorption train consisting of two absorbers filled with cadmium sulfate for collection of hydrogen sulfide. A Dry Ice trap is used to retain any light hydrocarbons that are not condensed in the column.

After charging 500 ml. of oil to be tested to the still pot of this apparatus a 100 ml. per minute stream of nitrogen was bubbled through it at room temperature for thirty minutes or until the amount of dissolved hydrogen sulfide became negligible. The nitrogen stream was reduced to 50 ml. per minute as heat was applied to the flask, and the temperature of the contents allowed to rise to 100° F. by withdrawing an appropriate quantity of distillate, if necessary. If hydrogen sulfide was being evolved, the charge was refluxed at that temperature for three hours while the amount of hydrogen sulfide absorbed from the gas stream was determined at the end of each thirty-minute period. If no hydrogen sulfide appeared after one hour, the flask temperature was increased to the next temperature level as quickly as possible, each increase being a 100° F. increment except the last, which was 50° F. It was impractical to attempt to heat the charge higher than 750° F. since at that temperature considerable coking occurred with some crudes.

The hydrogen sulfide was absorbed in a 0.2 molar solution of cadmium sulfate having a pH of 3.7. The sulfuric acid thus formed was potentiometrically titrated with 0.5 normal potassum hydroxide solution. The Dry Ice trap lights, distillate and residue were analyzed for sulfur content by the usual methods. The results of these tests are shown in Table III.

Two different hydrodesulfurized West Texas crudes were tested in runs 1 and 2. In run number 1 the West Texas crude came from a low-throughput run and was desulfurized to a low level. The hydrogen sulfide evolution showed a maximum at 400° F., and the sulfur evolved as hydrogen sulfide amounted to 26.0 per cent of the sulfur in the charge. In run number 2 the charged West Texas crude came from a long throughput run in which the catalyst was flushed with hydrogen every sixteenth throughout. The sample used in the thermal treatment test was taken during the throughput interval of 112–128. Although this sample contained about three times as much sulfur as the hydrodesulfurized crude charged in number 1, the fraction of the sulfur evolved as hydrogen sulfide was only 7.7 per cent and the evolution showed no sharp peak at any particular temperature. The difference in the behavior of the sulfur compounds in these two hydrodesulfurized West Texas crudes is quite marked and apparently is due to the difference in throughput. In run No. 3, the hydrodesulfurized Kuwait crude showed a very large hydrogen sulfide evolution at 400° F. Hydrodesulfurized Baxterville crude showed a similar hydrogen sulfide evolution at 400° F.

While removal of sulfur can be accomplished in accordance with our invention by heating the entire desulfurized product, it is advantageous to first subject the product to distillation to remove the lower boiling point products, for instance, gasoline and other products boiling below about 390° to 420° F. The undistilled residue is then heated to remove the sulfur in the form of hydrogen sulfide. It is also advantageous, but not essential, to pass a stripping gas or vapor such as steam or nitrogen through the hydrocarbon during the heat treatment.

What we claim is:

1. In a process of desulfurizing a high boiling petroleum oil which comprises contacting the petroleum oil, substantially in vapor phase, with hydrogen in the presence of a hydrogenation catalyst at a pressure between about 250 and 2,000 p. s. i. at a temperature between about 750° and 900° F., continuing such contacting until a substantial amount, but less than about sixteen parts of oil have been contacted with one part of the hydrogenation catalyst, ter-

TABLE III

| Description | Test No. | Charge | | H₂S Evolved | | Lights [1] | | Distillate [2] | | Residue [3] | | Percent Recovery | |
|---|---|---|---|---|---|---|---|---|---|---|---|---|---|
| | | Gms. | Percent S | Gms. | Percent of S Chg. | Gms. | Percent S | Gms. | Percent S | Gms. | Percent S | Wt. | S |
| Hydrodesulfurized West Texas Crude | 1 | 403.0 | .17 | .19 | 26.0 | 24.85 | .011 | 274.31 | .049 | 87.50 | .29 | 96.0 | 83.1 |
| Do | 2 | 416.7 | .56 | .19 | 7.7 | 21.32 | .035 | 277.91 | .326 | 107.50 | 1.160 | 97.7 | 100.3 |
| Hydrodesulfurized Kuwait Crude | 3 | 406.3 | .45 | 1.14 | 58.7 | 30.63 | .012 | 310.95 | .134 | 50.10 | .85 | 96.7 | 105.0 |
| Hydrodesulfurized Baxterville Crude | 4 | 397.8 | .218 | .18 | 19.7 | 41.96 | .008 | 317.72 | .122 | 27.90 | 1.10 | 97.5 | 100.2 |

[1] That part of charge entrained in the nitrogen stream leaving the column head and condensed in the Dry Ice trap.
[2] That part of charge which had to be withdrawn from the reflux condenser in order to raise the still pot temperature from one plateau to another.
[3] That portion of charge remaining in the flask at the end of the thermal stability test.

minating the contacting, regenerating the hydrogenation catalyst, again contacting the oil with the regenerated hydrogenation catalyst under the conditions specified above, the improvement which comprises removing lower boiling components from the desulfurized product so produced, heating the remainder of the desulfurized product at a temperature between about 375° and 500° F. for a period between about 15 minutes and 3 hours, whereby residual sulfurous material in the desulfurized product is converted into hydrogen sulfide and removed therefrom.

2. In a process of desulfurizing a crude petroleum oil which comprises contacting the crude petroleum oil, substantially in vapor phase, with hydrogen in the presence of a hydrogenation catalyst at a pressure between about 250 and 2,000 p. s. i. at a temperature between about 750° and 900° F. continuing such contacting until between about one and four parts of crude have been contacted with one part of hydrogenation catalyst, terminating the contacting, regenerating the hydrogenation catalyst by combustion with an oxygen-containing gas, again contacting the crude with the regenerated hydrogenation catalyst under the conditions specified above, the improvement which comprises distilling gasoline and lower boiling components from the desulfurized product so produced, heating the remainder of the desulfurized product at a temperature between about 375° and 500° F. for a period between about 15 minutes and 3 hours and passing a stripping gas through the hydrocarbon during said heat treatment, whereby sulfurous material left in the desulfurized product is converted into hydrogen sulfide and removed by the stripping gas.

3. In a process of desulfurizing a crude petroleum oil which comprises contacting the crude petroleum oil, substantially in vapor phase, with hydrogen in the presence of a hydrogenation catalyst at a pressure between about 250 and 2,000 p. s. i. at a temperature between about 750° and 900° F. continuing such contacting until between about one and four parts of crude have been contacted with one part of hydrogenation catalyst, terminating the contacting, regenerating the hydrogenation catalyst by combustion with an oxygen-containing gas, again contacting the crude with the regenerated hydrogenation catalyst under the conditions specified above, the improvement which comprises subjecting the desulfurized product to distillation to remove products boiling below about 390° to 420° F., heating the remainder of the desulfurized product at a temperature between about 375° and 500° F. for a period of about four hours, whereby sulfurous material left in the desulfurized product is converted into hydrogen sulfide and removing hydrogen sulfide from the desulfurized product by passing a current of an inert gas therethrough.

4. In a process of desulfurizing a crude petroleum oil which comprises contacting the crude petroleum oil, substantially in vapor phase, with hydrogen in the presence of a nickel tungstate hydrogenation catalyst at a pressure between about 250 and 2,000 p. s. i. at a temperature between about 750° and 900° F. continuing such contacting until between about one and four parts of crude have been contacted with one part of hydrogenation catalyst, terminating the contacting, regenerating the hydrogenation catalyst by combustion with an oxygen-containing gas, again contacting the crude with the regenerated hydrogenation catalyst under the conditions specified above, the improvement which comprises heating the portion of the desulfurized product boiling above about 420° F. for a period of about one hour at a temperature of about 400° F. while passing steam therethrough, whereby sulfurous material in the desulfurized product is converted into hydrogen sulfide and removed from the desulfurized product.

References Cited in the file of this patent

UNITED STATES PATENTS

| | | |
|---|---|---|
| 1,215,732 | Snelling | Feb. 13, 1917 |
| 1,932,174 | Gaus et al. | Oct. 24, 1933 |
| 2,136,382 | Houdry | Nov. 15, 1938 |
| 2,417,308 | Lee | Mar. 11, 1947 |